Figure 7:
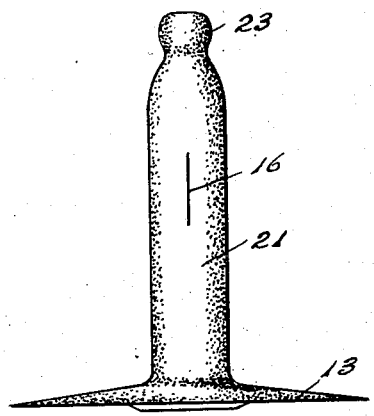

Nov. 2, 1954     E. H. BICKLEY     2,693,197
TIRE VALVE CLOSURE ASSEMBLY
Filed Oct. 7, 1952     2 Sheets-Sheet 1
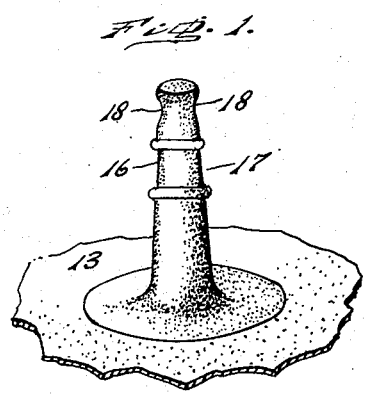
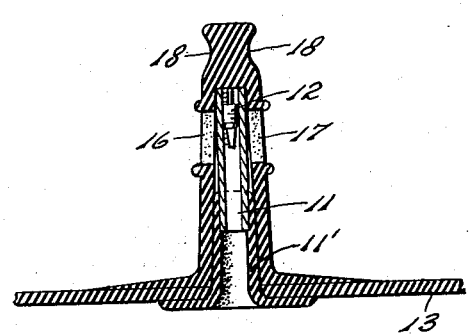
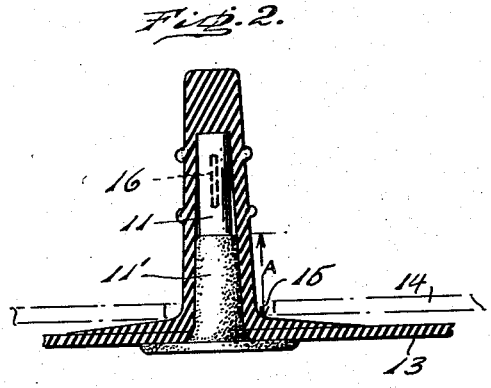
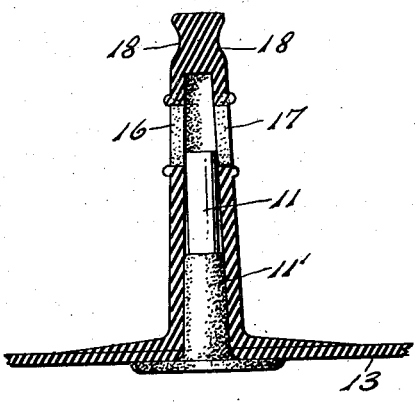
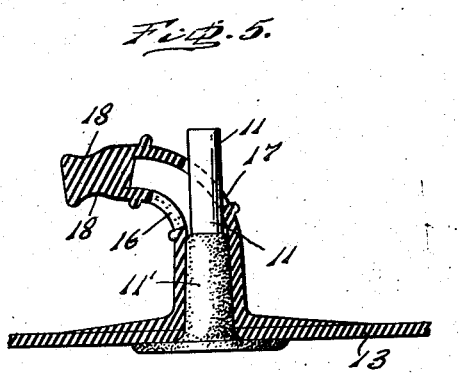
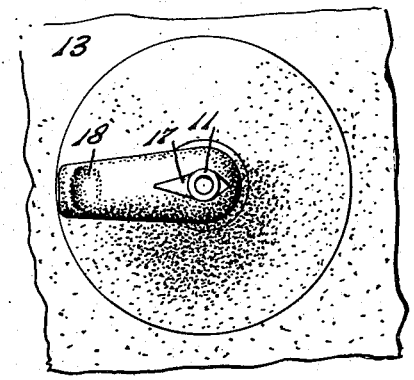
INVENTOR
Everett H. Bickley.
BY
Robert M. Barr
ATTORNEY.

Nov. 2, 1954  E. H. BICKLEY  2,693,197
TIRE VALVE CLOSURE ASSEMBLY
Filed Oct. 7, 1952  2 Sheets-Sheet 2

INVENTOR
Everett H. Bickley.
BY
Robert M. Barr
ATTORNEY.

United States Patent Office 2,693,197
Patented Nov. 2, 1954

2,693,197
TIRE VALVE CLOSURE ASSEMBLY
Everett H. Bickley, Narberth, Pa.
Application October 7, 1952, Serial No. 313,563
2 Claims. (Cl. 137—232)

The present invention relates to tire valves for automobiles, bicycles, airplanes or other vehicles using pneumatic tires, and more particularly to a novel closure assembly for association with such a valve, such as shown in abandoned application Serial No. 256,277, filed November 14, 1951, of which this application is a continuation-in-part.

In tire valves as now and heretofore in use, it has been the common practice to thread the free end of the valve stem for the reception of a removable cap as a closure for the valve to prevent leakage and keep out dust and dirt. Such caps are easily lost or stolen, thus leaving the valve exposed and unprotected, in which condition dirt enters the valve, thereby preventing proper seating so that leakage develops and a flat tire results. Also it has been proposed in United States Patent No. 2,275,820 to mold a large open aperture into a rubber sleeve of such a size as will permit the valve stem to pass freely through so that it becomes accessible for inflating the tire. This large aperture type is open to objections which defeat its object in that dirt enters freely and prevents proper seating of the valve so that leakage results in a flat tire. Furthermore, the large aperture weakens the rubber of the sleeve eccentrically so that after a short use breaking occurs requiring replacement of the closure, or causes the closure to improperly seat and/or retain air pressure in case of valve leakage, and due to the large area, insufficient tension can be brought to bear to retain the customary pressures now used.

Some of the objects of the present invention are: to provide an improved closure for tire valves; to provide a non-removable closure for a tire valve; to provide a closure for tire valves wherein danger of leakage at any time is eliminated; to provide a closure which serves as a protection for the valve stem when changing a tire; to provide a closure of resilient material capable of stretching and bending so that it can be manipulated to open and close access to the tire valve while remaining an integral or attached part of a tire valve stem; to provide a novel valve assembly for association with the closure sleeve to form an amplified resistance to pressure so that the tension of the rubber of the stem counteracts any chance of leakage about the valve; to provide a closure with a self-closing slit, as distinguished from an opening, which is held closed by rubber compression but permits the valve stem to penetrate the slit and pass therethrough for attachment of an air hose; and to provide other improvements as will hereinafter appear.

Figure 8:
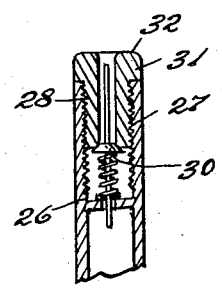
Figure 9:
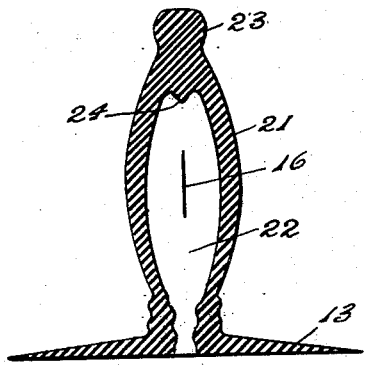
Figure 10:
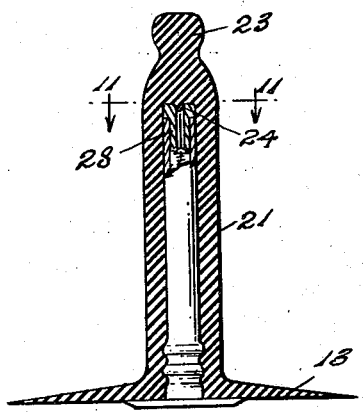
Figure 11:
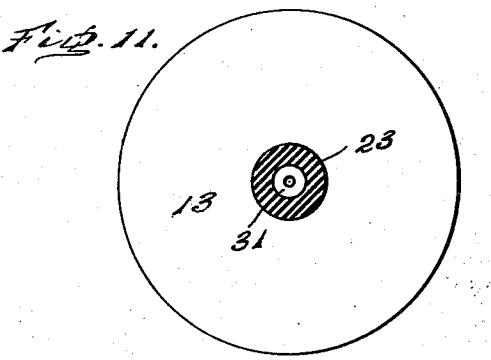
Figure 12:
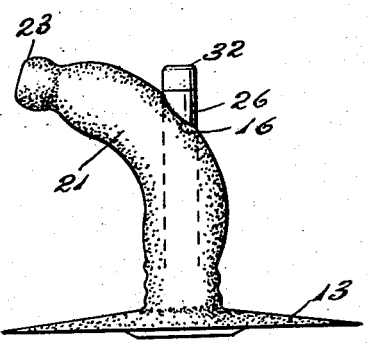

In the accompanying drawings, Fig. 1 represents a perspective of a tire valve closure embodying one form of the present invention; Fig. 2 represents a sectional elevation of the closure as assembled with a tire valve and viewed from the front and in closed position; Fig. 3 represents a like section viewed from the side and also in closed position; Fig. 4 represents a sectional elevation showing the closure as stretched initially preliminary to lateral bending; Fig. 5 represents a sectional elevation showing the closure in position for access to the valve; Fig. 6 represents a plan of Fig. 5; Fig. 7 represents a side elevation of a tire valve closure embodying a modified form of the invention; Fig. 8 represents an enlarged detail in axial section of a novel valve part for association with the closure of the invention; Fig. 9 represents a medial section of the closure as initially shaped ready for the insertion of the valve stem; Fig. 10 represents a like section but showing the valve stem in place and the closure stretched to place the slit under compression; Fig. 11 represents a section on line 11—11 of Fig. 10; and Fig. 12 represents a side elevation showing the valve stem protruded for use.

Referring to the drawings, one form of the present invention comprises a closure in the form of a tubular member closed at one end and open at the other end for telescopic fitting about the stem 11 of a tire valve 12. The stem 11 is preferably made without the usual external threads for cap assembly, but the closure of the invention can be assembled with the usual threaded stem when it is to function as an attached part. The closure is made of rubber or other suitable resilient material lending itself to stretching and bending. Preferably the closure, as shown in Fig. 1, is molded as an integral part of the inner tube 13, which as usual seats against the encircling metal rim 14 of the vehicle wheel, while the closure, when assembled, protrudes through the usual aperture 15 of the rim 14. The bore of the closure has a snug fit about the valve stem 11, and has its inner end portion vulcanized to the stem base 11' and part way up the length of the closure, as illustratively indicated at A. The upward termination of the vulcanizing is such that the major portion of the closure is free for longitudinal elongation by stretching under manual upward pull in order to bend it out of the vertical to expose the end of the valve stem.

In order to thus expose the valve stem when the closure is stretched to operating position, one side of the closure is provided with a longitudinally disposed slit 16, through the closure wall, having a length sufficient to permit the valve stem to pass through when the closure is stretched to bring the slit 16 into register with the stem 11 and the closure is bent laterally as shown in Fig. 5. Preferably a second slit 17 is provided at the opposite side of the closure, also longitudinally disposed, and in horizontal alinement with the aforesaid slit 16. While a single slit entirely serves the purpose of gaining access to the valve stem, the dual slit construction permits the closure to be bent in either of two directions and so may be found more convenient.

For ease in grasping and manipulating the closure, oppositely disposed depressions 18 are molded adjacent the free end of the closure to form a knob-like end as an effective grasp for pulling, stretching, and bending the closure.

In operation the free end of the closure is grasped by the user and an axial pull transmitted to the closure to thereby stretch and increase its length until a slit, either 16 or 17, is brought substantially into the plane of the end of the valve stem, this location being such that a lateral bending of the closure causes the stem to penetrate the overlying slit by pressing the resilient material apart and thus finally emerge as shown in Fig. 5. At this time the air inlet is exposed to receive air from the hose leading from a source of compressed air. When the tire has been properly inflated, the closure is stretched and bent in the reverse direction until brought into register with the valve stem, whereupon, when released, it retracts to closed position with the slit 16 sealed by the side of the valve stem.

Referring to the modified form of the invention, a closure body 21 is molded of rubber with an open end bore 22 to receive the valve parts, and a closed end externally shaped as a hand gripping knob 23. Also, the closed end is internally molded with an axially disposed cone-shaped projection 24 serving as an auxiliary valve, as will be described hereinafter. The open end of the body 21 is molded as a part of the inner tube 13 of the tire, as will be understood.

Referring to Fig. 8, the preferred form of valve parts comprises an elongated tubular stem 26 having an internal end thread 27 by which a bushing insert 28 is attached to the stem 26 to provide a seat on its inner end in the path of the usual spring-pressed valve 30. The other end of the insert 28 terminates in a head 31 abutting the end of the stem 26 in assembled condition and forming an outer convex or rounded rim 32 dimensioned to snugly encircle the projection 24 when assembled. Thus, the rim 32 forms a leak-proof seat about the projection 24. The insert 28 has a relatively small diameter bore to reduce the inside diameter of the stem 26 at its outer end so that leakage pressure is so throttled that the tension of the rubber will hold the pressure. Comparing this construction with the standard valve stem of 3/16" inside diameter wherein the area is 0.028, the pressure with a leaky valve is 0.028 x 26 giving 7.3 lbs. With the insert 28 having an inside diameter of 0.092, area 0.0067, the pressure with a leaky valve is 0.0067 x 26 giving 1.7 lbs. pressure which can be held by the rubber tension.

In order to expose the end of the valve stem for attaching an air hose thereto, the closure body 21 is provided with a longitudinally disposed self-closing slit 16 parallel to the axis of the body 21 of such a length as will permit the stem 26 to penetrate the slit and pass therethrough and is also located so that the body 21 can be stretched endwise to bring the slit 16 into register with the end of the valve stem as the body is turned sidewise to force the stem into a protruding position. The dimension of the slit 16 and its relation to the body are critical and the association can be explained as follows: The body 21 as shown in Fig. 9 is molded with a transverse bulge intermediate its length forming a substantially elliptical bore having a length proportionately less than the length of the stem 26 to cause the body 21 to be stretched axially and held under tension by the entering stem 26 in assembling. Before so assembling, however, the slit 16 is cut by an extremely thin utensil, such as a razor blade, so that it is characterized by such extreme thinness as to be normally held closed and sealed by the compressive action of the rubber as tensioned by the inserted stem 26. As shown in Fig. 9, the bulge holds the slit 16 closed, but relaxed so that as the bulge collapses by the endwise stretching of the body by the entering stem 26, the lips of the slit 16 are now forcibly pinched together and for all normal contingencies completely sealed. The slit 16, so closed, lies in closed joint contact with a side of the stem 26 as a further measure of protection against leakage.

As shown in Fig. 10, the stem 26 has stretched the body to its normal operating position with the valve 30 seated against the insert 28 in leak-proof relation. A further guard against leakage is provided by the auxiliary seal formed by the rounded rim 32 encircling the projection 24 which seats against the outer end of the stem-carried insert 28.

When a tire with this novel valve assembly thereon requires air, the knob 23 is grasped by the user and an axial pull is transmitted to the body 21 to stretch it to a position where the slit 16 can be brought into register with the end of the stem 26 as the body is bent laterally and downward over the stem to thus cause the stem to penetrate the overlying slit and protrude as shown in Fig. 12. The inlet end of the insert is now accessible to receive air from a hose leading from a source of compressed air. When the tire has been properly inflated, the body 21 is reversely bent and stretched to return the stem to the interior thereof and is then released so that the tensioned rubber not only snaps the slit closed, but seals it against the side of the valve stem.

From the foregoing it will be seen that a novel method has been devised for forming and assembling a closure for a tire valve whereby a slit is cut in a molded closure to provide a closed end valve stem-receiving bore having a length shorter than the length of the valve stem so that when assembled with the stem the latter distends the closure endwise under tension to produce a slit-closing pressure under non-filling conditions of the closure.

It will now be apparent that a novel tire valve assembly has been devised which eliminates the use of a removable dust cap while resulting in an effective dust-proof seal for a valve stem. As an added advantage the closure is an attached part forming a housing about the valve stem which acts as a protective element in changing tires. By reason of the elasticity and resilience of the closure and the location of the slit, which passes the valve, the closure is capable of two positions relative to the valve stem, the closed position locating the slit sealed against the side of the stem and the open position being attained by stretching the closure endwise relative to the stem to bring the slit beyond the end of the stem and then bending the closure so that the stem is pressed through the slit for access to the inlet end thereof. It should further be noted that the resilient rubber closure is self-closing due initially to the elasticity of the material which is thereafter augmented and maintained closed by the lateral pressure developed under the applied tension by the longer valve stem entering the shorter closure bore.

Having thus described my invention, I claim:
1. A tire valve assembly comprising the combination of a tire valve stem, a bushing insert attached to the end of said stem having a seat and an air supply valve for the seat at one end and an auxiliary annular seat at the opposite end, a resilient closure having a stem-receiving bore snugly surrounding said stem, closed at its inner end, an auxiliary valve formed on said inner end of said closure to seat upon said auxiliary seat in assembled condition, said closure having a self-closed slit longitudinally disposed through the wall thereof located for registration with said insert when said closure is stretched axially and bent laterally over said stem, and mounting means on the outer end of the closure.
2. A tire valve assembly in accordance with claim 1 wherein said auxiliary valve comprises a projection to coact with said auxiliary seat.

References Cited in the file of this patent
UNITED STATES PATENTS

| Number | Name | Date |
|---|---|---|
| 223,396 | Shabley | Jan. 6, 1880 |
| 425,530 | Wayte | Apr. 15, 1890 |
| 1,930,040 | Crowley | Oct. 10, 1933 |
| 2,275,820 | Hosking | Mar. 10, 1942 |

FOREIGN PATENTS

| Number | Country | Date |
|---|---|---|
| 460,180 | Italy | Oct. 19, 1950 |
| 15,093 | Switzerland | July 19, 1897 |
| 616,925 | Germany | Aug. 8, 1935 |